United States Patent [19]

Ishizuka et al.

[11] Patent Number: 5,880,839
[45] Date of Patent: Mar. 9, 1999

[54] OPTICAL DISPLACEMENT MEASURING APPARATUS INCLUDING A LIGHT-EMITTING ELEMENT AND AN ADJACENT BALL LENS

[75] Inventors: Kou Ishizuka, Ohmiya; Yasushi Kaneda, Utsunomiya, both of Japan

[73] Assignee: Canon Kabushiki Kaisha, Tokyo, Japan

[21] Appl. No.: 949,193

[22] Filed: Oct. 14, 1997

Related U.S. Application Data

[63] Continuation of Ser. No. 541,100, Oct. 11, 1995, abandoned.

[30] Foreign Application Priority Data

Oct. 12, 1994 [JP] Japan .................................. 6-272973
Oct. 2, 1995 [JP] Japan .................................. 7-278364

[51] Int. Cl.[6] ................................................... G01B 9/02
[52] U.S. Cl. ..................... 356/356; 356/354; 250/237 G
[58] Field of Search ................................ 356/345, 359, 356/360, 356, 354; 250/548, 237 G

[56] References Cited

U.S. PATENT DOCUMENTS 3,930,729  1/1976  Gunn ........................................ 359/664
5,283,434  2/1994  Ishizuka et al. .................... 250/237 G
5,390,022  2/1995  Ishizuka et al. ........................ 356/356
5,448,358  9/1995  Ishizuka et al. ........................ 356/373

FOREIGN PATENT DOCUMENTS 5340719  12/1993  Japan .

*Primary Examiner*—Robert Kim
*Attorney, Agent, or Firm*—Fitzpatrick, Cella, Harper & Scinto

[57] ABSTRACT

An optical displacement detecting apparatus is provided for detecting information on a relative displacement with respect to an object having a diffraction grating. The apparatus includes a light-emitting element for emitting a diverging light beam, a ball lens for converting the diverging light beam from the light-emitting element into a nearly collimated beam, a grating interference optical system for using the light beam from the ball lens to finally form interference light in such a form that two diffracted light beams from the diffraction grating are coupled, and a light detecting element for detecting the interference light from the grating interference optical system, wherein the relative displacement information with respect to the object is attained from a periodic signal from the light detecting element.

22 Claims, 9 Drawing Sheets

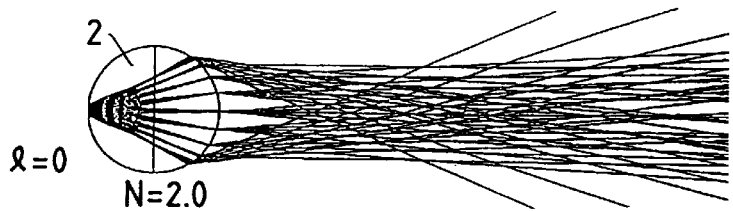
FIG. 6A  ℓ=0  N=2.0
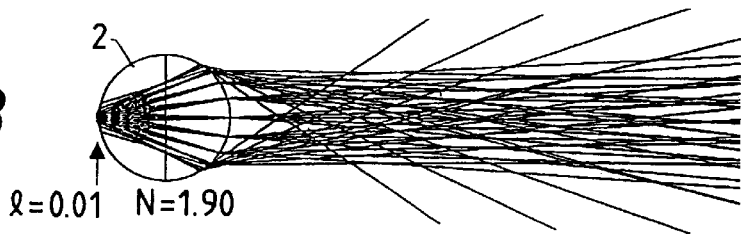
FIG. 6B  ℓ=0.01  N=1.90
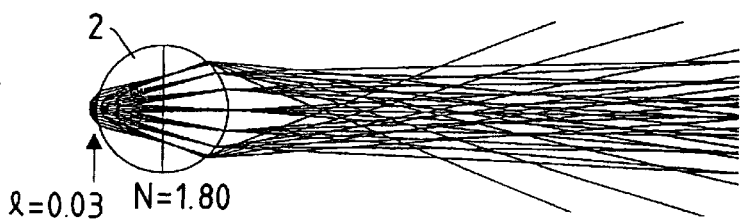
FIG. 6C  ℓ=0.03  N=1.80
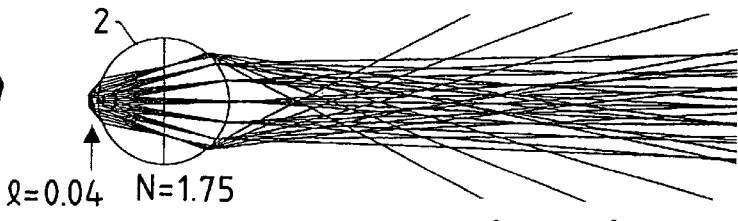
FIG. 6D  ℓ=0.04  N=1.75
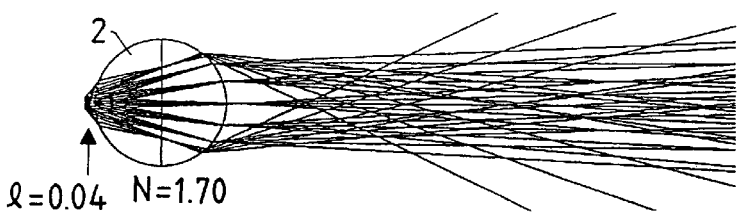
FIG. 6E  ℓ=0.04  N=1.70
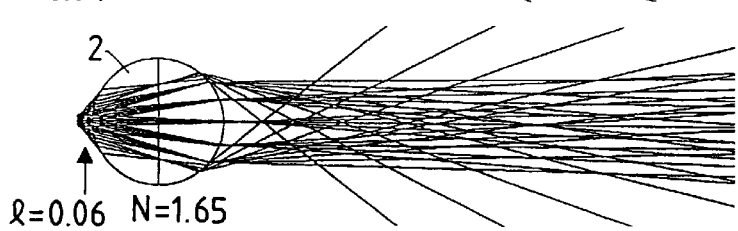
FIG. 6F  ℓ=0.06  N=1.65
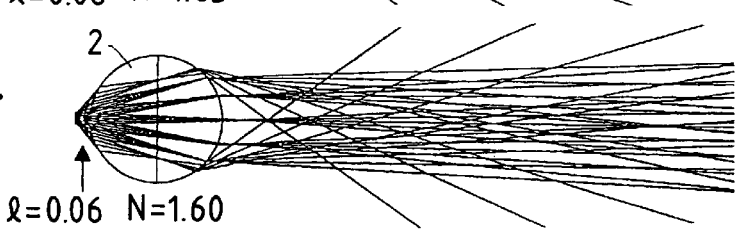
FIG. 6G  ℓ=0.06  N=1.60
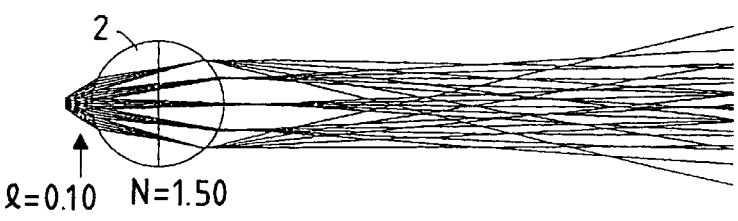
FIG. 6H  ℓ=0.10  N=1.50

η=1.5  N=2.0

N=1.9

N=1.8

N=1.75

N=1.7

N=1.65

N=1.60

N=1.5

OPTICAL DISPLACEMENT MEASURING APPARATUS INCLUDING A LIGHT-EMITTING ELEMENT AND AN ADJACENT BALL LENS

This application is a continuation of application Ser. No. 08/541,100, filed Oct. 11, 1995, now abandoned.

BACKGROUND OF THE INVENTION

1. Field of the Invention

The present invention relates to an optical displacement measuring apparatus, and more particularly to an optical displacement measuring apparatus applicable to encoders for measuring a displacement or a velocity of an object, velocity sensors, acceleration sensors, length measuring apparatus, etc., utilizing the fact that when light impinging on a moving object is diffracted and scattered, the thus diffracted and scattered light is subject to phase modulation according to a displacement or a moving velocity of the object.

2. Related Background Art

As conventional apparatus for obtaining an amount of movement or displacement of an object at high accuracy there have been used, for example, optical encoders, laser Doppler velocimeters, laser interferometers, etc., utilizing interference of diffracted or scattered light beams from the object illuminated with light.

A specific feature of these apparatus utilizing the light is the feasibility of easily achieving high accuracy and high resolution of the wavelength order of light, but there is a demand for miniaturization (into the size of the millimeter order), to enhance the stability, "easiness to handle," and durability of the interference optical system, etc. in order to be applied in further wider fields.

The applicant proposed in the bulletin of Japanese Laid-open Patent Application No. 5-340719 a high-accuracy optical linear encoder utilizing interference based on diffracted light phase-modulated by a moving object. The same bulletin discloses an optical encoder that is simple in arrangement of the optical system, stable in interference between diffracted light, easy in handling, and suitable for miniaturization.

FIGS. 1 to 3 are schematic diagrams to show the major part of the optical encoder proposed in the same bulletin. Among them, FIG. 1 is a perspective view of the major part, and FIGS. 2A and 2B are schematic diagrams of the major part. In FIG. 1, 1a designates a light-emitting element such as a laser diode, CL a cylindrical lens, and ASP an aspherical lens, on a flat surface side of which a beam splitting diffraction grating G1, as detailed below, is disposed. The cylindrical lens CL and aspherical lens ASP compose an anamorphic optical system. Further, 4a denotes a transparent substrate, on which a beam superimposing diffraction grating G3 as described below is disposed. Reference numeral 20 represents a scale attached to a detected object relatively moving, on which a diffraction grating G2, as detailed below is disposed. Here, G1 is the beam splitting diffraction grating (for example of grating pitch P1=1.6 μm), G2 the diffraction grating (for example of grating pitch P2=1.6 μm) disposed on the scale 20, and G3 the beam superimposing diffraction grating (for example of grating pitch P3=1.6 μm).

The beam superimposing diffraction grating G3 is placed on the same plane as the beam splitting diffraction grating G1. The beam superimposing diffracting grating G3 includes four parts G3a, G3b, G3c, G3d, which are formed at grating positions shifted from each other as shown in FIG. 3, thereby providing light beams incident to the respective parts with relative phase deviation π/2 between them. PD denotes a quartered photoelectric element (light-receiving element) composed of photocells PDa–PDd.

As constructed in the above structure, the optical displacement measuring apparatus operates as follows. A diverging light beam R emitted from the light-emitting element 1a is converted into a linearly converging light beam R' by the cylindrical lens CL. The beam next enters the aspherical lens ASP, and thereby the beam R' becomes emergent from the rear plane of the aspherical lens ASP so as to be condensed near the diffraction grating G2 in the direction of grating lines and nearly is collimated with the direction along the arrangement of grating lines. On this occasion the light is split by the beam splitting diffraction grating G1 into two light beams, i.e., zeroth-order diffracted light beam R0 advancing straight and +first-order diffracted light beam R+1, which are incident on the scale 20 relatively moving. In this event, the center rays of the respective light beams are incident at points P1, P2 on the diffraction grating G2 on the scale. Among the light beam R0 linearly illuminating the point P1, a light beam R0+1+first-order-diffracted by the diffraction grating G2 is diffracted by the diffraction grating G3. Among diffracted beams a light beam R0+1-1-first-order-diffracted there is emergent nearly normally from the diffraction grating G3.

Among the light beam R+1, a light beam R+1-1-first-order-reflection-diffracted by the diffraction grating G2 is incident to the diffraction grating G3. Among those diffracted a light beam R+1-10 traveling straight through the diffraction grating G3 is emergent nearly normally from the diffraction grating G3. The two beams R0+1-1, R+1-10 are superimposed on the beam superimposing diffraction grating G3 to interfere with each other with their wavefronts overlapping, then entering the quartered photoelectric device PD.

Employment of such an arrangement of the optical system enables the encoder to achieve high accuracy and being easy to handle, because the interference state is stable even with the occurrence of relative positional deviation (angular deviation such as azimuth, tilt, etc.) between the "diffraction grating G2 on the scale" and the "detecting head portion consisting of the beam splitting diffraction grating G1, beam superimposing diffraction grating G3, light-emitting element, photoelectric element, etc."

SUMMARY OF THE INVENTION

The present invention is an application of the invention in the previous application, and a first object of the invention is to provide an optical displacement measuring apparatus which uses a ball lens properly arranged, whereby even in the use of a surface emitting element such as a light-emitting diode, the apparatus can secure a sufficient quantity of light as being excellent in reliability, a stable interference state can be achieved even with a mounting error of scale, and the apparatus can be easy to handle and can achieve high accuracy.

Other objects of the present invention will be apparent in the description of embodiments which follows.

BRIEF DESCRIPTION OF THE DRAWINGS

FIGS. 2A and 2B are schematic diagrams to show the major part of the conventional optical displacement measuring apparatus, wherein FIG. 2A is a plan view and FIG. 2B a side view;

FIGS. 5A and 5B are drawings to show Embodiment 1 of the present invention, wherein FIG. 5A is a plan view of the major part and FIG. 5B a side view of the major part;

FIGS. 6A to 6H are explanatory drawings to illustrate an index dependence of characteristics of light collimated by a ball lens;

FIGS. 7A and 7B are drawings to show Embodiment 2 of the present invention, wherein FIG. 7A is a plan view of the major part and FIG. 7B a side view of the major part;

DESCRIPTION OF THE PREFERRED EMBODIMENTS

Figure 4:
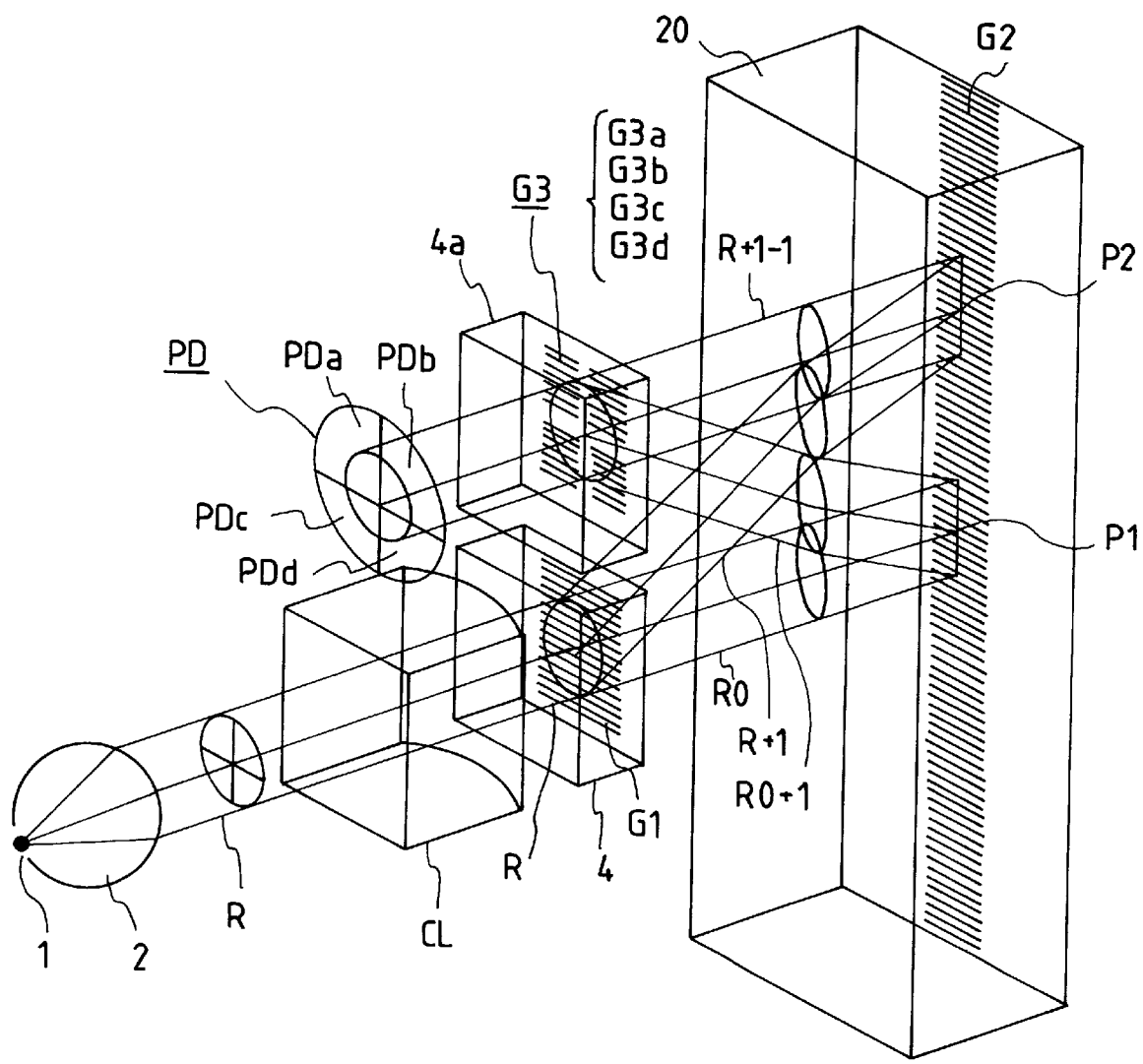
FIG. 4 is a perspective view to show the major part of Embodiment 1 of the present invention.
Figure 5A:
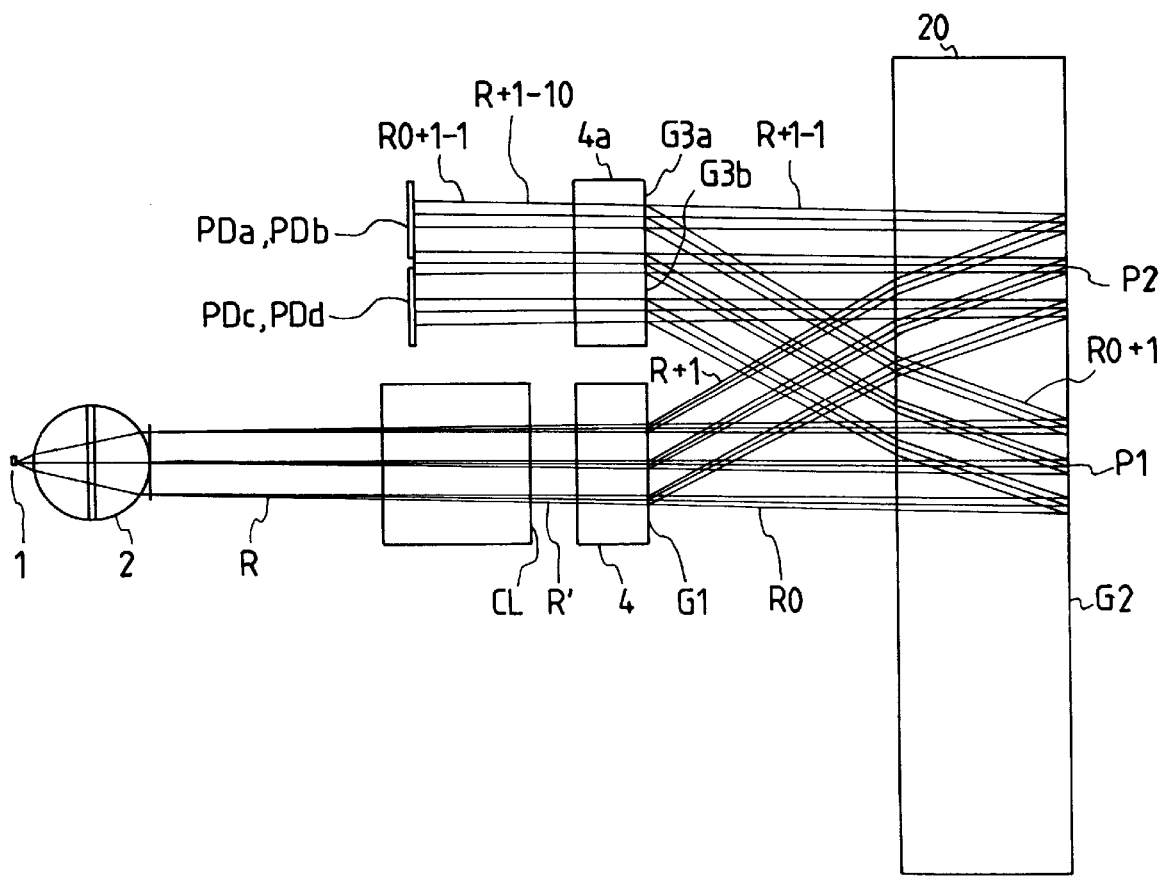
Figure 5B:
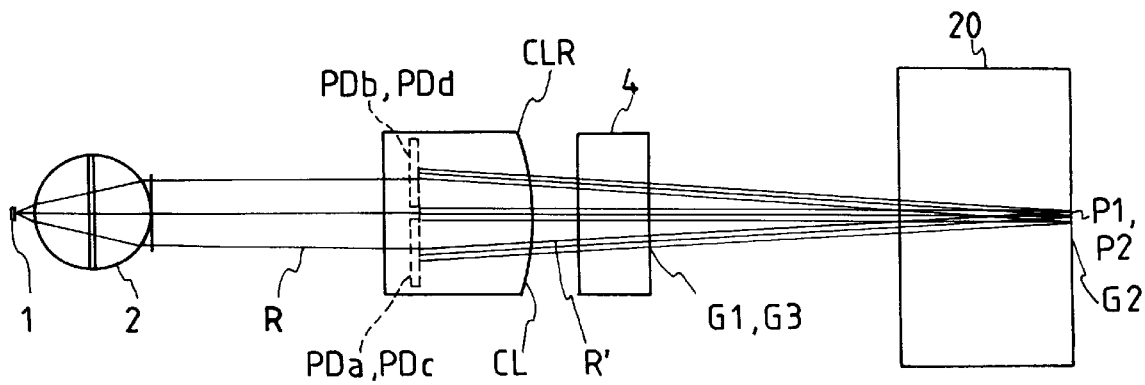

FIG. 4 is a perspective view of the major part of Embodiment 1 of the present invention, and FIGS. 5A and 5B are a plan view and a side view of the major part of FIG. 4. In the drawings, reference numeral 1 designates a surface emitting element, for example a light-emitting portion of a light-emitting diode (LED). Numeral 2 denotes a ball lens, which is made of a glass material of BK7 or TaF-3 (either of which is a trade name) and sized in the diameter of 1 mm. The following description is based on the glass material being TaF-3 (with a refractive index of about 1.8). CL represents a cylindrical lens, a radius of curvature CLR of which is 2.0 mm. G1 denotes a beam splitting diffraction grating (of grating pitch P1=1.6 $\mu$m), G2 a diffraction grating (of grating pitch P2=1.6 $\mu$m) on the scale 20, and G3 a beam superimposing diffraction grating (of grating pitch P3=1.6 $\mu$m).

Figure 1:
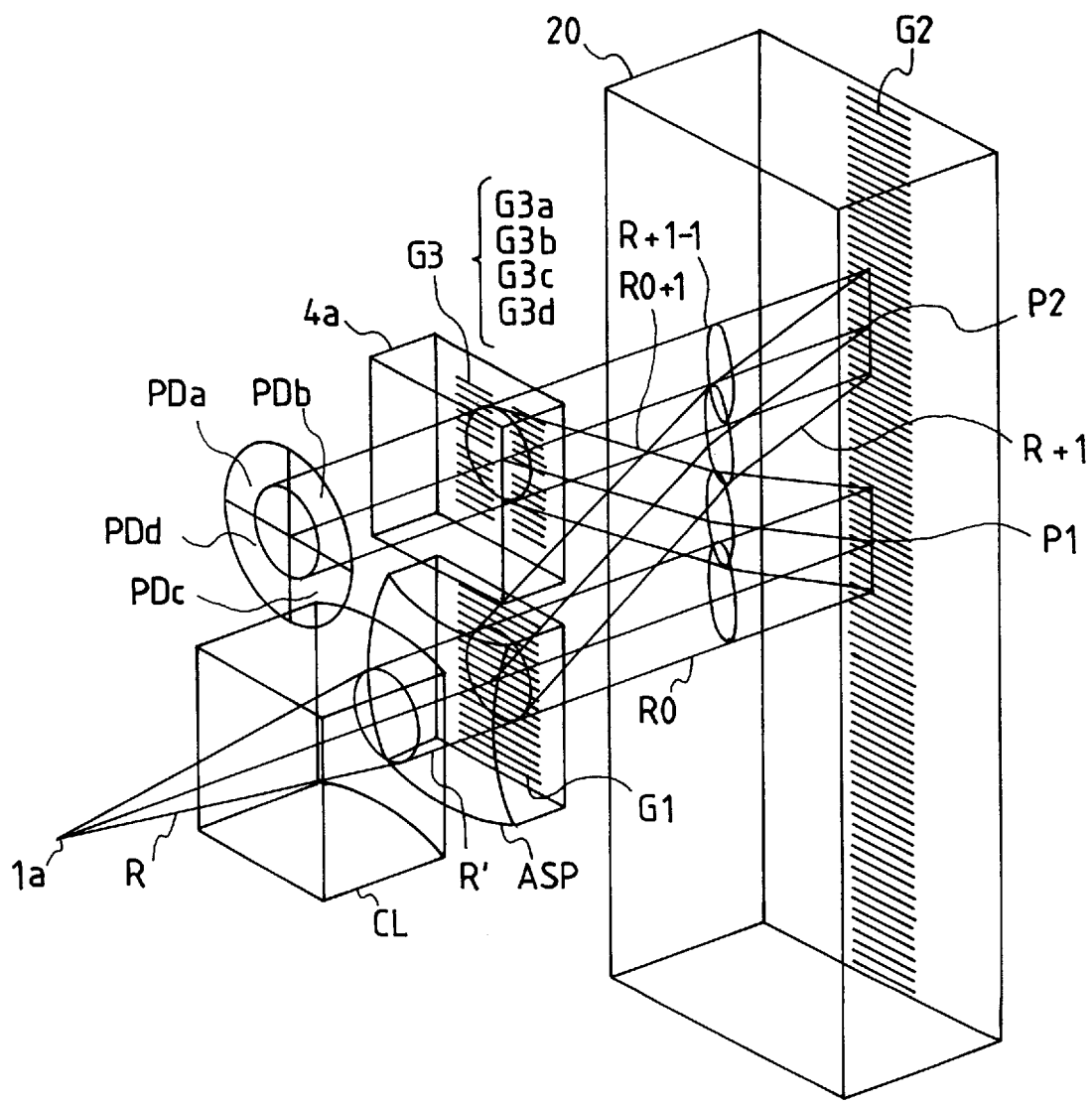
FIG. 1 is a perspective view of the major part of a conventional optical displacement measuring apparatus.
Figure 2A:
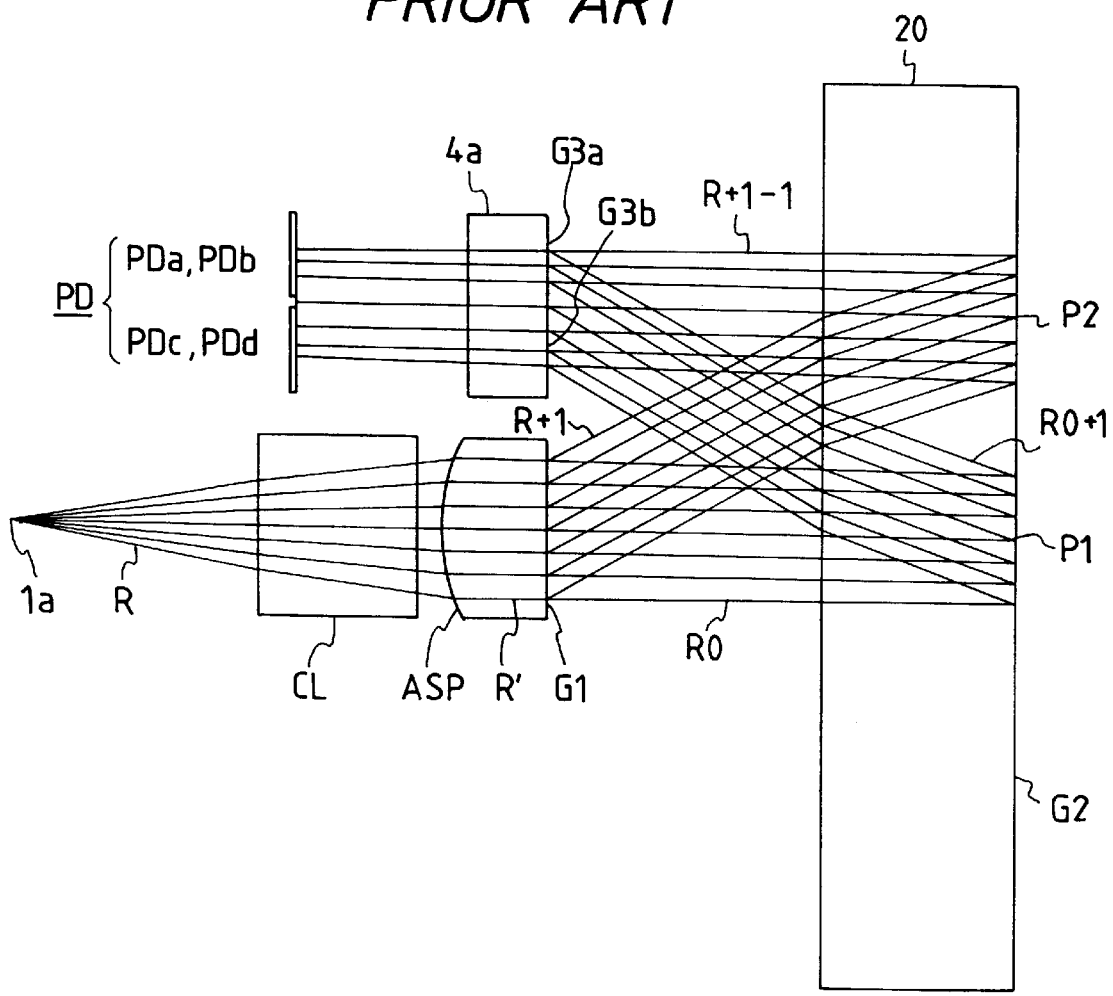
Figure 2B:
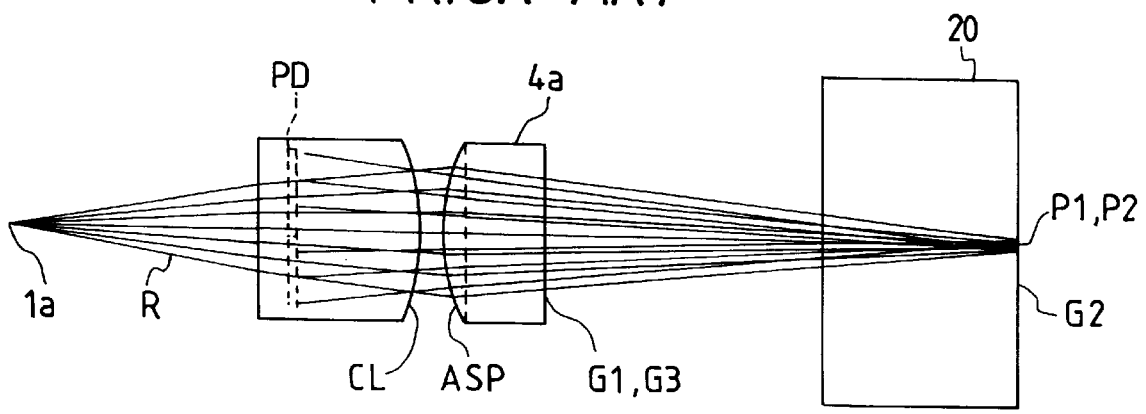
Figure 3:
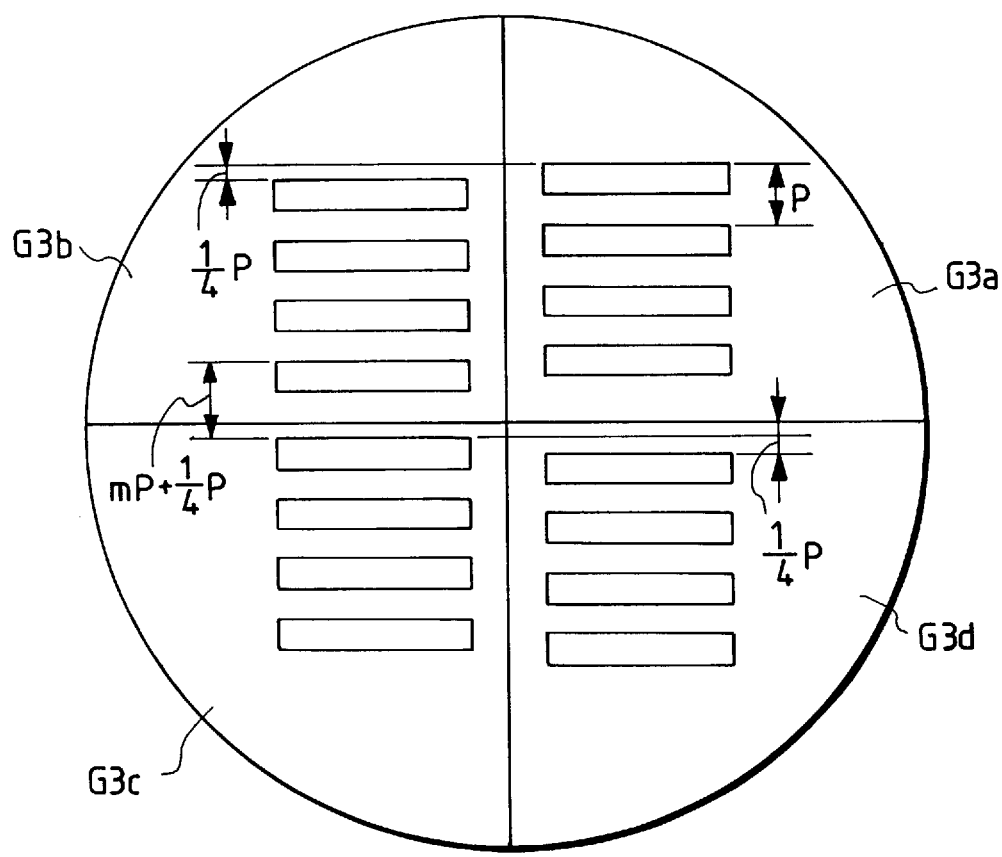
FIG. 3 is an explanatory drawing to show the major part of a beam superimposing diffraction grating.

Here, the beam superimposing diffraction grating G3 is set on the same plane as the beam splitting diffracting grating G1 is. The beam superimposing diffraction grating G3 is composed of four parts G3a, G3b, G3c, G3d, which are formed at grating positions shifted from each other as shown in FIG. 3, thereby providing light beams incident to the parts with relative positional deviation of $\pi/2$ between them. PD is a quartered photoelectric element (light-receiving element) composed of photocells PD$a$, PD$b$, PD$c$, PD$d$. Reference numeral 4 denotes a transparent substrate on which the beam splitting diffraction grating G1 is disposed, and 4$a$ a transparent substrate on which the beam superimposing diffraction grating G3 is disposed. Reference numeral 20 designates a scale which is attached to a detected object relatively moving, and the diffraction grating G2 is disposed on the scale 20.

The operation of the present embodiment is next explained. A diverging light beam emitted from the surface emitting element 1 is converted into a nearly collimated beam or a weakly diverging light beam by the ball lens 2, and the cylindrical lens CL changes it into a beam R' linearly condensed in the direction of grating lines on the scale 20. Next, the beam splitting diffraction grating G1 formed on the surface of the transparent substrate 4 splits the beam into a beam R0 zeroth-order-transmission-diffracted and a beam R+1+first-order-transmission-diffracted, which are emergent from the diffraction grating G1.

The light beam R0 traveling straight through the beam splitting diffraction grating G1 is reflection-diffracted at point P1 on the diffraction grating G2 formed on the scale 20 to generate +first-order-reflection-diffracted light R0+1. At the same time, the +first-order-reflection-diffracted light R0+1 is subject to phase modulation according to relative movement of the diffraction grating G2. In detail, with movement $\Delta x$ of the scale 20, the phase of the +first-order-diffracted light R0+1 will have a shift of $+2\pi\Delta x/P$. The +first-order-diffracted light R0+1 thus phase-modulated then reaches the beam superimposing diffraction grating G3 formed on the surface of the transparent substrate 4$a$, where it is transmission-diffracted into a plurality of beams, among which a –first-order-diffracted light beam R0+1-1 is emergent from the beam superimposing diffraction grating G3 nearly normally to the surface thereof.

On the other hand, the beam R+1+first-order-diffracted by the beam splitting diffraction grating G1 is linearly condensed near point P2 on the diffraction grating G2 formed on the scale 20 and then reflection-diffracted to generate –first-order-diffracted light R+1-1. At the same time as it, the –first-order-diffracted light R+1-1 is subject to phase modulation according to relative movement of the diffraction grating G2. With movement $\Delta x$ of the scale 20, the phase of the –first-order-diffracted light R+1-1 will have a shift of $-2\pi\Delta x/P$.

Part of the –first-order-diffracted light R+1-1 thus phase-modulated is transmission-diffracted by the beam superimposing diffraction grating G3 into a plurality of beams, among which zeroth-order-diffracted light (transmitted light traveling straight) R+1-10 is emergent from the beam superimposing diffraction grating G3 nearly normally to the surface thereof.

The beam R0+1-1 and beam R+1-10 emerging from the beam superimposing diffraction grating G3 travel in their superimposing optical paths to form interference light, which enters the quartered photoelectric element PD. Since the four parts (G3a–G3d) in the beam superimposing diffraction grating G3 each are arranged to provide their phase differences shifted in $\pi/2$ from each other, the wavefront of the beam R0+1-1–first-order-diffracted by the beam superimposing diffraction grating G3 is split into four parts provided with relative phase deviations of $\pi/2$ shifted from each other, which are incident into the quartered photoelectric element PD (PDa-PDd). Accordingly, beams of the interference light entering the quartered photoelectric element PD become periodic signals with phase differences $\pi/2$ shifted from each other, and each generates a bright and dark signal of one period with movement of a half pitch of the diffraction grating G2 on the scale 20, which is received by each photoelectric element (PD$a$–PD$d$). An amount of displacement and a direction of displacement of the scale 20 are obtained by processing the four signals from the photoelectric element by a well-known signal processing method.

The surface emitting element 1 is sufficiently smaller than the ball lens 2, and the weakly diverging light beam emitted from the ball lens 2 is set to be a nearly collimated beam.

Here, although the quantity of light can be increased as the size of the light-emitting portion of the surface emitting element 1 becomes larger, aberration of the ball lens makes it difficult to obtain a collimated light beam with large diameters of the light-emitting portion of the surface emitting element 1.

Letting d be the diameter of the surface-emitting portion and D be the diameter of the ball lens, a practically usable region of the surface emitting element is about one tenth of the diameter of the ball lens. Specifically, if the diameter of the ball lens is 1.0 mm and the maximum diameter of the light-emitting portion of the surface emitting element is greater than 100 μm, light emitted from outside the diameter φ 100 μm becomes components of diverging light to be unnecessary light, which is wasteful and which negatively affects signal light when superimposed thereon. In this respect, the diameter d of the light-emitting portion of the surface emitting element needs to be set to the necessary minimum. Further, it is possible to expand a gap between the ball lens and the surface emitting element so as to make the entire light beam emitted from the light-emitting portion of the surface emitting element nearly collimated on average, but in that case, a quantity of rays captured by the ball lens decreases. Thus, it will result in not increasing the quantity of light taken as a nearly collimated beam even if the area of the surface emitting element is increased.

Here, letting N be a refractive index of the ball lens, if the distance l between the light-emitting element and the ball lens is corrected so that the ball lens changes the light beam from the light-emitting element into a nearly collimated beam, as shown in FIGS. 6A to 6H, the number of rays in the nearly collimated beam formed by the ball lens changes depending upon a value of refractive index N. In the drawings, lines extending rightward through the ball lens 2 represent rays forming the nearly collimated beam. The drawings show respective cases when the refractive index N is changed to decrease from top to bottom.

FIGS. 6A to 6H are illustrated based on calculation under such assumption that the light-emitting element has the size (80 μm) which is 8% of the diameter of the ball lens, the surface emitting region is represented by five point light-emitting sources, and each point light-emitting source emits diverging light in a single circular cone.

Supposing the number of rays in the nearly collimated light beam with the refractive index of ball lens being 2.0 is 100%, the number of rays become about 70% in cross section for the refractive index of ball lens of 1.75. Namely, the number of rays (light quantity) projected onto a unit plane becomes about 50%. Thus, the light quantity from the light source will be lost for half or more below this refractive index.

Accordingly, when the ball lens and the light-emitting element are thus disposed in a space through a gap (corresponding to the refractive index of 1.0) between them, a nearly collimated beam with a sufficient light quantity can be obtained by using a ball lens having the refractive index N thereof to satisfy the following relation.

$1.80 \leq N \leq 2.0$

The present embodiment uses the ball lens made of the glass material having a refractive index of about 1.8, which is included in the above range.

The condensing action of the cylindrical lens CL is set to work in the direction of grating lines in the diffraction grating G2, and it is preferred that the zeroth-order-diffracted light R0 be linearly condensed at a position sightly after the diffraction grating G2 and that the +first-order-diffracted light R+1 be linearly condensed slightly before the diffraction grating G2.

Since Embodiment 1 employs the optical light-projecting means in which the fine ball lens is disposed in the proximity of the surface emitting element such as a LED, it can enjoy the following advantages.

(1-a) The interference light can be obtained in a sufficient light quantity even if an LED is employed as a light source. Namely, it is to be desired that the size of the light-emitting surface of the light source be smaller in order to form a linearly condensed beam in as good quality as employing the surface emitting light source LED. However, the LED with a decreased size of light-emitting surface will supply an extremely smaller light quantity than semiconductor lasers, thus weakening the interference signal so as to lower the detection accuracy, which makes it difficult to achieve a high-accuracy optical displacement measuring apparatus.

The present embodiment, however, uses the ball lens even with a decreased area of the light-emitting surface of LED, whereby the diverging light beam emitted in the wide angular range from the LED can be taken in at a large solid angle, it can be converted into the weakly diverging light in a narrow angular range, and further, it is again converted into the linearly condensed light etc. to obtain the interference signal. Accordingly, the quantity of emission light of the LED can be effectively utilized to obtain the interference signal at a high S/N ratio.

(1-b) Since the present embodiment employs the highly reliable surface emitting LED as a light source having greater anti-surge characteristics and durability than the semiconductor lasers, the embodiment can realize an optical displacement measuring apparatus enjoying both the advantages of easiness to handle and high reliability of light source.

(1-c) Since the small surface emitting LED is used as a light source, dissipation power is decreased and heating of apparatus is small. Thus, the present embodiment can overcome problems due to heating (offset of light-receiving element or electronic circuits, dark current, thermal expansion or deformation of diffraction gratings, etc.), which are likely to arise when miniaturization is sought for by incorporating the light source, light-receiving element, electronic circuits, and optical elements including the diffraction gratings, in a package of the millimeter order. Accordingly, the present embodiment achieved the optical displacement measuring apparatus which is compact but stable in accuracy.

(1-d) Although a normal plano-convex lens or biconvex lens might to be used in place of the ball lens, the ball lens in the size of the millimeter order has such an advantage that it can be produced at lower cost than the normal lenses, because techniques for producing a lot of such ball lenses are already established as those for so-called beads.

As described above, Embodiment 1 achieved the optical displacement measuring apparatus having the both advantages of high accuracy and easiness of handling.

Figure 7A:
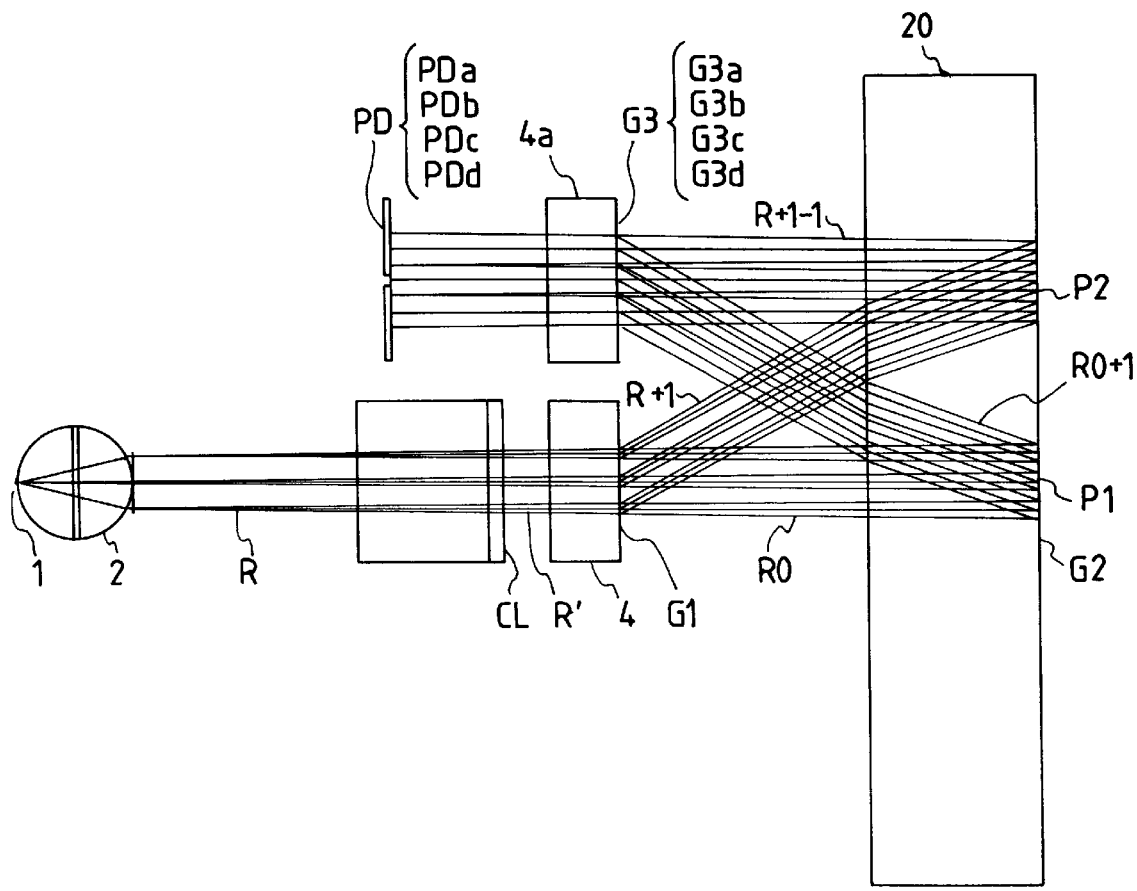
Figure 7B:
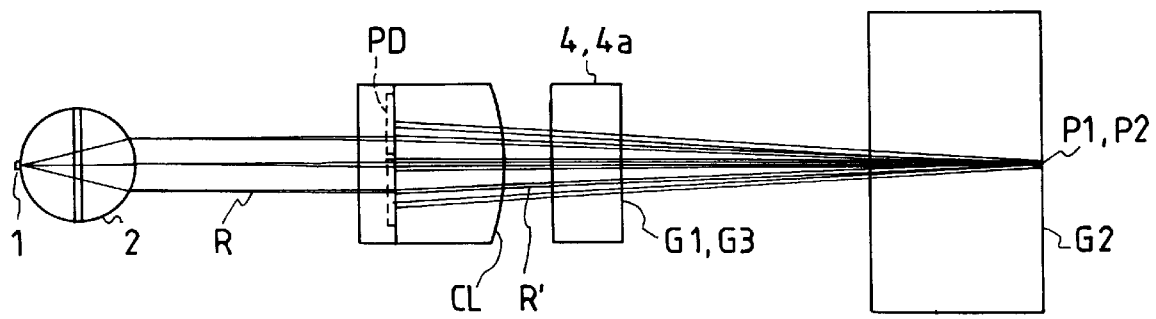
Figure 8A:
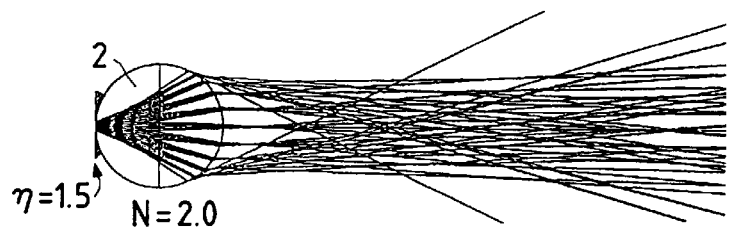
FIGS. 8A to 8H are explanatory drawings to illustrate an index dependence of characteristics of light collimated by another ball lens.
Figure 8B:
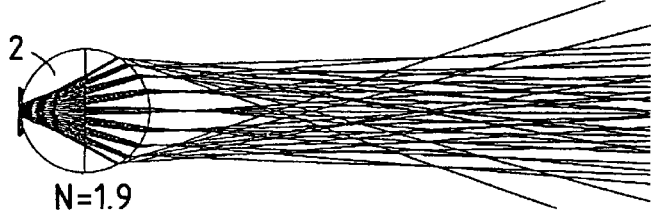
Figure 8C:
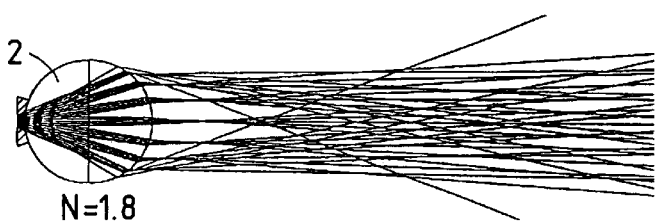
Figure 8D:
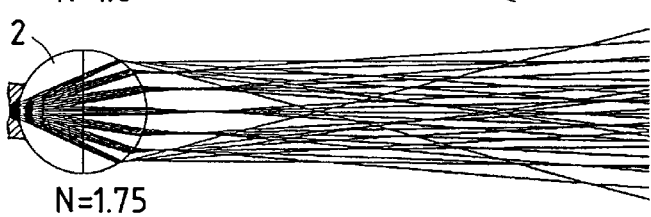
Figure 8E:
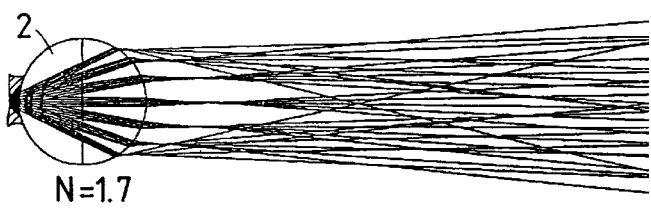
Figure 8F:
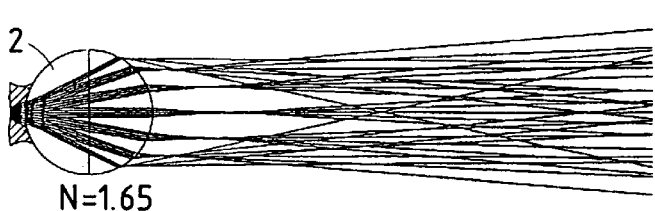
Figure 8G:
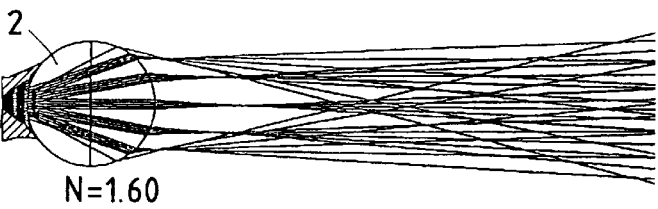
Figure 8H:
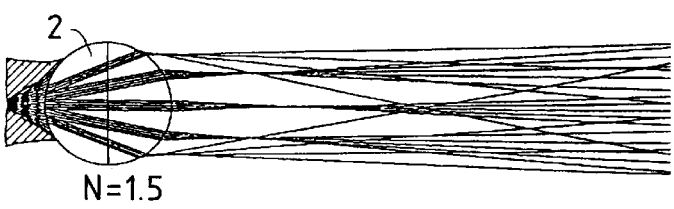

FIGS. 7A and 7B are a plan view and a side view to show the major part of Embodiment 2 of the present invention. In the drawings, reference numeral 1 designates a surface emitting element such as the LED. Reference numeral 2 denotes a ball lens, which is made of a glass having a refractive index of about 2 and which has the diameter of 0.5 mm. The surface emitting element 1 and ball lens 2 are bonded to each other. The other arrangement is the same as that of Embodiment 1.

The operation of the present embodiment is next explained. A diverging light beam emitted from the surface emitting element 1 is condensed by the surface of the ball lens 2 bonded thereto to become a beam R of nearly collimated light or weakly diverging light, then entering the cylindrical lens CL. Optical paths and actions of respective elements after that are the same as those in Embodiment 1.

Here, like the first embodiment described above, as the diameter of the light-emitting portion of the surface emitting element 1 increases, it becomes more difficult to obtain the collimated light beam because of aberration of the ball lens.

Letting d be the diameter of the surface-emitting portion and D be the diameter of the ball lens, a practically usable region of the surface emitting element is about one tenth of the diameter of the ball lens, as described previously. Specifically, if the diameter of the ball lens is 0.5 mm and the maximum diameter of the light-emitting portion of the surface emitting element is greater than 50 µm, light emitted from outside the diameter φ50 µm becomes components of diverging light to be unnecessary light, which is wasteful and which negatively affects signal light when superimposed thereon. In this respect, the diameter d of the light-emitting portion of the surface emitting element needs to be set to the necessary minimum. Further, it is possible to expand a gap between the ball lens and the surface emitting element so as to make the entire light beam emitted from the light-emitting portion of the surface emitting element nearly collimated on average, but in that case, a quantity of rays captured by the ball lens decreases. Thus, it will result in not increasing the quantity of light taken as a nearly collimated beam even if the area of the surface emitting element is increased.

Here, letting N be a refractive index of the ball lens, if the distance 1 between the light-emitting element and the ball lens is corrected so that the ball lens changes the light beam from the light-emitting element into a nearly collimated beam, as shown in FIGS. 8A to 8H, the number of rays in the nearly collimated beam formed by the ball lens changes depending upon a value of refractive index N. In the drawings, lines extending rightward through the ball lens 2 represent rays forming the nearly collimated beam. The drawings show respective cases when the refractive index N is changed to decrease from top to bottom.

FIGS. 8A to 8H are illustrated based on such calculation under assumption that the light-emitting element has the size (40 µm) which is 8% of the diameter of the ball lens, the surface emitting region is represented by five point light-emitting sources, each point light-emitting source emits diverging light in a single circular cone, and an adhesive resin having a refractive index equivalent to 1.5 as a general value fills in a space between the light-emitting element and the ball lens.

In the case of the adhesive resin filling the space, supposing the number of rays in the nearly collimated light beam with the refractive index of ball lens being 2.0 is 100%, the number of rays becomes about 70% in cross section for the refractive index 1.70 of ball lens. Namely, the number of rays (light quantity) projected onto a unit plane becomes about 50%. Thus, the light quantity from the light source will be lost for half or more below this refractive index.

Accordingly, when the space between the ball lens and the light-emitting element is thus filled with a transparent resin (corresponding to the refractive index of 1.5), a sufficient light quantity can be obtained by using a ball lens having the refractive index N thereof to satisfy the following relation.

$1.75 \leq N \leq 2.0$

Since Embodiment 2 employs the optical light-projecting means constructed by directly bonding the small ball lens to the surface emitting element such as the LED, different from Embodiment 1, it can enjoy the following advantages.

(2-a) It can obtain the interference light in a further sufficient light quantity as compared with Embodiment 1. Namely, because the LED is generally of a high-index material such as GaAs, a critical angle of the light emitted from the surface of the light-emitting element into the resin material as being an index material is greater than that when the light is emitted from the surface of the light-emitting element into air. Thus, Embodiment 2 has a higher pickup efficiency of the beam generated in the material of the light-emitting element. Accordingly, since Embodiment 2 more effectively utilizes the light quantity of emitted light, it can obtain the interference signal at an even higher S/N ratio than Embodiment 1 can. FIGS. 6A to 6H and FIGS. 8A to 8H show light beams under such conditions that the surface emitting element is represented by the five point light-emitting sources on the surface emitting element and each point light-emitting source emits rays in a circular cone, but the numbers of rays are drawn in the same number between FIGS. 6A to 6H and FIGS. 8A to 8H for convenience of illustration. In fact, the number of rays (light quantity) emitted in the circular cone from each point of the light-emitting source is greater in FIGS. 8A to 8H where the resin is used for bonding.

In addition, in the present embodiment, the arrangement in which the light source is in contact with the ball lens can be employed, particularly because the refractive index is 2. In this case, because occurrence of spherical aberration is especially low, most rays become components of nearly collimated light, thereby decreasing losses of light and obtaining a further larger interference signal than in Embodiment 1.

(2-b) Particularly in the case of the refractive index being 2, the ball lens may be arranged to be directly bonded in fit with a concave portion of the surface emitting element, which can lower a possibility of deviation of an optical path due to an alignment error (eccentricity) of the lens, thus facilitating assembling.

(2-c) Since the surface emitting element LED and ball lens are incorporated in a unity, the present embodiment is excellent in environmental stability.

As described above, Embodiment 2 achieves the optical displacement measuring apparatus having even greater accuracy and easiness of handling than Embodiment 1.

In addition to the above embodiments, the following arrangements can be employed.

(3-1) Either of Embodiments 1 and 2 as described above employs the light-projecting optical system for linearly condensing the light beam from the light-emitting element by the cylindrical lens CL, but depending upon the purpose of use of encoder, the light-projecting optical system excluding the cylindrical lens CL can be employed for illuminating the diffraction grating G2 on the scale 20 with a beam of weakly diverging light or nearly collimated light.

(3-2) The size of the ball lens in the above Embodiments 1, 2 is arbitrary. (3-3) The ball lens in above Embodiments 1, 2 may be oval like a Rugby ball. In that case, if the lens is arranged to have converging characteristics in the minor-axis direction (the direction of grating lines in the diffraction grating G2) so as to focus an image near the diffraction grating G2 and weakly diverging (nearly collimated) characteristics in the major-axis direction, linearly condensed illumination can be achieved without a cylindrical lens. In this case, the utility factor of light quantity of emission light from LED becomes higher with the minimum number of components.

(3-4) The cylindrical lens CL may be a machine-processed product set in the optical path as in Embodiments 1, 2, but may be formed on a transparent substrate by replica molding or the like. In that case, the diffraction optic effect of a Fresnel lens, a zone plate, or the like may be employed to achieve the same effect. Further, the cross sections of the beam splitting diffraction grating G1 and beam superimposing diffraction grating G3 may be of a blazed grating, a lamellar grating, or another grating.

(3-5) The apparatus may be modified into an apparatus for measuring a relative rotational displacement of a disk by forming the scale 20 in a disk shape and placing the diffraction grating G2 in Embodiments 1, 2 in the form of a radial diffraction grating with the radiation center at the rotation center on the disk 20 relatively rotating.

Figure 9:
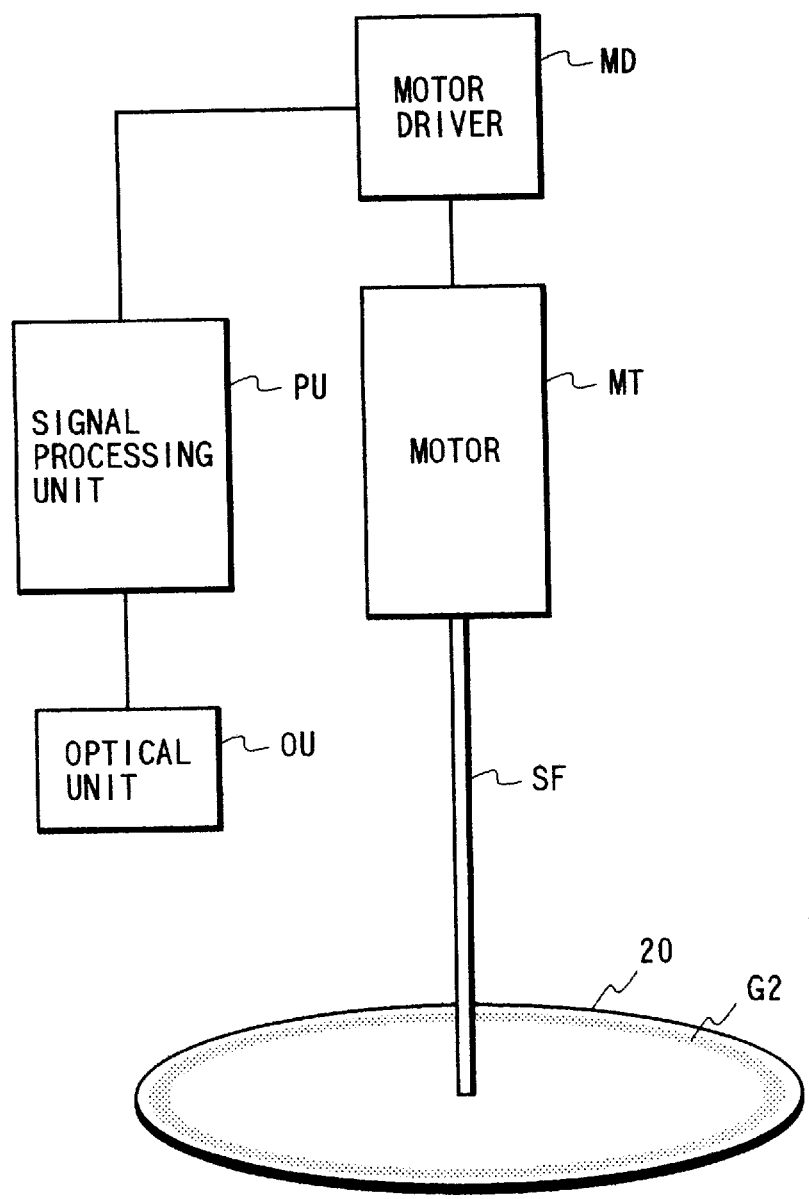
FIG. 9 is a schematic drawing to show the construction of a modification of the present invention.

FIG. 9 is an explanatory drawing to show such an embodiment. In the drawing, OU represents an optical unit in which the all members except for the part of scale 20 in FIG. 4 or FIGS. 7A and 7B are arranged, PU a signal processing unit, MD a motor driver, MT a motor, and SF a drive shaft to which the disk 20 and another driven member not shown are connected. According to the same principle as described above, the periodic signals with rotation of disk 20 are sent from the quartered photoelectric element not shown in the optical unit OU to the signal processing unit PU. The signal processing unit calculates an amount of rotation and a direction of rotation of the disk from the periodic signals by a well-known method, and controls drive of shaft SF by motor MT through the motor driver MD according to a built-in program, based on the calculation.

Based on the above constitution, each embodiment as explained above achieved the optical displacement measuring apparatus excellent in reliability while securing a sufficient light quantity, capable of obtaining a stable interference state even with a mounting error of the scale, easy to handle, and capable of achieving high accuracy even in the use of the surface emitting element such as a light emitting diode by using the ball lens properly arranged.

What is claimed is:

1. An optical displacement detecting apparatus for detecting information on relative displacement with respect to an object having a diffraction grating, comprising:

a light-emitting element for emitting a diverging light beam, said light-emitting element being a surface emitting element;

a ball lens for converting the diverging light beam from said light-emitting element into an almost collimated beam, said ball lens and said light-emitting element being adjacent to one another, said ball lens and said light-emitting element being fixed by filling transparent resin in a space between said ball lens and said light-emitting element;

a grating interference optical system for using the light beam from said ball lens to finally form interference light in such a form that two diffracted light beams from the diffraction grating are coupled; and a light detecting element for detecting the interference light from said grating interference optical system, wherein the information on the relative displacement with respect to the object is attained from a periodic signal from said light detecting element.

2. The apparatus according to claim 1, wherein said grating interference optical system forms the interference light in such a form that two diffracted light beams from a diffraction grating one-dimensionally arranged as the diffraction grating are coupled and wherein information on a relative linear displacement with respect to the object is obtained from the periodic signal from said light detecting element.

3. The apparatus according to claim 1, wherein said grating interference optical system forms the interference light in such a form that two diffracted light beams from a diffraction grating radially arranged as the diffraction grating are coupled and wherein information on a relative rotational displacement with respect to the object is obtained from the periodic signal from said light detecting element.

4. The apparatus according to claim 1, wherein a refractive index N of said ball lens satisfies a relation of $1.75 \leq N \leq 2.0$.

5. The apparatus according to claim 1, wherein a gap is arranged between said light-emitting element and said ball lens.

6. The apparatus according to claim 5, wherein a refractive index N of said ball lens satisfies the relation of $1.8 \leq N \leq 2.0$.

7. The apparatus according to claim 1, wherein said ball lens has an oval shape.

8. The apparatus according to claim 1, wherein said grating interference optical system comprises a beam splitting diffraction grating for splitting the light beam from said ball lens into two beams, and a beam coupling diffraction grating for coupling two diffracted light beams generated when the two beams are incident to said diffraction grating, thereby forming the interference light.

9. The apparatus according to claim 8, wherein said grating interference optical system further comprises an anamorphic optical element disposed between said ball lens and said beam splitting diffraction grating.

10. The apparatus according to claim 8, wherein said beam splitting diffraction grating is formed on the same plane as said beam coupling diffraction grating.

11. An optical displacement detecting apparatus for detecting information on relative displacement with respect to an object having a diffraction grating, comprising:

a light-emitting element for emitting a diverging light beam, said light-emitting element being a surface emitting element;

a ball lens for converting the diverging light beam from said light-emitting element into an almost collimated beam, said ball lens and said light-emitting element being adjacent to one another;

a grating interference optical system for using the light beam from said ball lens to finally form interference light in such a form that two diffracted light beams from the diffraction grating are coupled; and a light detecting element for detecting the interference light from said grating interference optical system, wherein the information on the relative displacement with respect to the object is attained from a periodic signal from said light detecting element, wherein a maximum diameter of a light-emitting region of said light-emitting element is set to one tenth or less of a diameter of said ball lens.

12. A drive system comprising:

a diffraction grating formed on an object relatively driven;

a light-emitting element for emitting a diverging light beam, said light-emitting element being a surface emitting element;

a ball lens for converting the diverging light beam from said light-emitting element into an almost collimated beam, said ball lens and said light-emitting element being adjacent to one another, said ball lens and said light-emitting element being fixed by filling transparent resin in a space between said ball lens and said light-emitting element;

a grating interference optical system for using the light beam from said ball lens to finally form interference light in such a form that two diffracted light beams from said diffraction grating are coupled;

a light detecting element for detecting the interference light from said grating interference optical system; and a control system for controlling relative displacement with respect to the relatively driven object, based on a periodic signal from said light detecting element.

13. An optical displacement detecting apparatus for detecting information on relative displacement with respect to an object, comprising:

a light-emitting element for emitting a diverging light beam, said light-emitting element being a surface emitting element;

a ball lens for converting the diverging light beam from said light-emitting element into an almost collimated beam, said ball lens and said light-emitting element being adjacent to one another, said ball lens and said light-emitting element being fixed by filling transparent resin in a space between said ball lens and said light-emitting element;

an interference optical system for using the light beam from said ball lens to finally form interference light in such a form that two modulated light beams from the object are coupled; and a light detecting element for detecting the interference light from said interference optical system, wherein the information on the relative displacement with respect to the object is attained from a periodic signal from said light detecting element.

14. The apparatus according to claim 13, wherein a refractive index N of said ball lens satisfies a relation of $1.75 \leq N \leq 2.0$.

15. The apparatus according to claim 13, wherein a gap is arranged between said light-emitting element and said ball lens.

16. The apparatus according to claim 13, wherein a refractive index N of said ball lens satisfies a relation of $1.8 \leq N \leq 2.0$.

17. An optical displacement detecting apparatus for detecting information on relative displacement with respect to an object, comprising:

a light-emitting element for emitting a diverging light beam, said light-emitting element being a surface emitting element;

a ball lens for converting the diverging light beam from said light-emitting element into an almost collimated beam, said ball lens and said light-emitting element being adjacent to one another;

an interference optical system for using the light beam from said ball lens to finally form interference light in such a form that two modulated light beams from the object are coupled; and a light detecting element for detecting the interference light from said interference optical system, wherein the information on the relative displacement with respect to the object is attained from a periodic signal from said light detecting element, wherein a maximum diameter of a light-emitting region of said light-emitting element is set to one tenth or less of a diameter of said ball lens.

18. An optical information detecting apparatus comprising:

a light-emitting element, from which a divergent light is emitted, said light-emitting element being a surface emitting element;

a ball lens for converting a beam of the divergent light from said light-emitting element into a substantially collimated light beam, said ball lens and said light-emitting element being adjacent to one another, said ball lens and said light-emitting element being fixed by filling transparent resin in a space between said ball lens and said light-emitting element;

a detecting optical system for irradiating an object with a light beam from said ball lens to have a predetermined information as to the object;

a light detecting element for detecting a light beam having the predetermined information as to the object, the predetermined information as to the object being obtained based on detection by said light detecting element.

19. An optical information detecting apparatus comprising:

a light-emitting element, from which divergent light is emitted, said light-emitting element being a surface emitting element;

a lens element for converting a beam of the divergent light from said light-emitting element into a substantially collimated light beam, said lens element and said light-emitting element being adjacent to one another, said lens element and said light-emitting element being fixed by filling transparent resin in a space between said lens element and said light-emitting element;

a detecting optical system for irradiating an object with a light beam from said lens element to have a predetermined information as to the object; and a light detecting element for detecting a light beam having the predetermined information as to the object., the predetermined information as to the object being obtained based on detection by said light detecting element.

20. An optical displacement detecting apparatus for detecting information on relative displacement with respect to an object, comprising:

a light-emitting element, from which divergent light is emitted, said light-emitting element being a surface emitting element;

a lens element for converting a beam of the divergent light from said light-emitting element into a substantially collimated light beam, said lens element and said light-emitting element being adjacent to one another, said lens element and said light-emitting element being fixed by filling transparent resin in a space between said lens element and said light-emitting element;

an interference optical system for using the light beam from said lens element to finally form interference light; and a light detecting element for detecting the interference light from said interference optical system, wherein the information on the relative displacement with respect to the object is attained from a periodic signal from said light detecting element.

21. The apparatus according to claim 20, wherein said interference optical system is a grating interference optical system which forms the interference light in such a form that two diffracted light beams from a diffraction grating provided on the object and illuminated by at least a light beam from said light-emitting element via said lens element are coupled.

22. A drive system comprising:

a diffraction grating formed on an object relatively driven;

a light-emitting element, from which divergent light is emitted, said light-emitting element being a surface emitting element;

a lens element for converting a beam of the divergent light from said light-emitting element into a substantially collimated light beam, said lens element and said light-emitting element being adjacent to one another, said lens element and said light-emitting element being fixed by filling transparent resin in a space between said lens element and said light-emitting element;

a grating interference optical system for using the light beam from said ball lens to finally form interference light in such a form that two diffracted light beams from said diffraction grating are coupled;

a light detecting element for detecting the interference light from said grating interference optical system; and a control system for controlling relative displacement with respect to the object, based on a periodic signal from said light detecting element.

* * * * *

UNITED STATES PATENT AND TRADEMARK OFFICE
CERTIFICATE OF CORRECTION

PATENT NO. : 5,880,839

DATED : March 9, 1999

INVENTOR(S) : KOU ISHIZUKA, ET AL.

It is certified that error appears in the above-identified patent and that said Letters Patent is hereby corrected as shown below:

COVER PAGE [56] FOREIGN PATENT DOCUMENTS,
"5,340719" should read --5-340719--.

COLUMN 1,
Line 57, "below" should read --below,--.

COLUMN 2,
Line 39, "being" should read --is--.

COLUMN 3,
Line 42, "G1 is." should read --G1.--.

COLUMN 4,
Line 21, "as it" should be deleted; and
Line 24, "Ax" should read --Δx--.

COLUMN 5,
Line 49, "relation." should read --relation:--; and
Line 51, "the glass" should read --glass--.

COLUMN 6,
Line 20, "source" should read --source,--;
Line 40, "might to" should read --might--; and
Line 46, "the both" should read --both the--.

UNITED STATES PATENT AND TRADEMARK OFFICE
CERTIFICATE OF CORRECTION

PATENT NO. : 5,880,839

DATED : March 9, 1999

INVENTOR(S) : KOU ISHIZUKA, ET AL.

It is certified that error appears in the above-identified patent and that said Letters Patent is hereby corrected as shown below:

COLUMN 8,
Line 4, "can" should be deleted; and
Line 46, "arbitrary. (3-3)" should read --arbitrary.
¶ (3-3)--.

COLUMN 9,
Line 6, "the all" should read --all the--.

COLUMN 10,
Line 5, "the" should read --a--.

Signed and Sealed this

Fourteenth Day of December, 1999

Attest:

Q. TODD DICKINSON

*Attesting Officer*       *Acting Commissioner of Patents and Trademarks*